2,974,047
METHOD OF PRODUCING CURED PACKED SLICES OF PIG MEAT

Alan William Holmes, Sharnbrook, England, assignor to Thomas J. Lipton, Inc., Hoboken, N.J., a corporation of Delaware No Drawing. Filed May 5, 1958, Ser. No. 732,805

Claims priority, application Great Britain May 9, 1957

3 Claims. (Cl. 99—174)

This invention relates to the preparation of food products and, more particularly, to the preparation of cured meats.

The curing of meats such as bacon has been carried out from early times by methods which have become traditional in the industry. According to such methods, sides of bacon pigs are immersed in strong brine containing other salts necessary for the curing, notably alkali metal nitrates. The sides are allowed to remain in the brine for a prolonged time, generally about five days, and are then removed from the brine and allowed to mature for a further length of time, generally about ten days. An alternative process is dry salting, in which salts are rubbed into the dry means and the meat allowed to remain exposed to air for a prolonged time, generally some weeks. It will be seen that such processes are time-consuming ones, but because of prejudice in the industry, the belief has persisted that times of treatment of the order described are essential to obtain the desired flavour and colour.

According to the present invention, there is provided a process for the preparation of cured meat from pig meat in which slices of pig meat are treated with brine containing nitrite ions for a time not exceeding one day, the slices are removed from the brine and are subsequently allowed to mature.

Variables in the process are the thickness of the slices being cured, the concentration of sodium chloride in the brine, the concentration of nitrite ions in the brine, the time of treatment of the slices with the brine, and the temperature of the brine.

SLICE THICKNESS

Usually, the slice thickness will be selected first and will be determined by the thickness of the product which it is desired to make. Generally, it is preferred to use slices of about 2 mms. to about 8 mms. in thickness since these are convenient to handle, require comparatively short times of treatment with brine and hence lend themselves to a continuous process. The thickness may be varied, as desired, however, and slices of 25 mms., 40 mms. or more in thickness can be used. Slices of less than about 1.5 mms. are difficult to handle without tearing.

The greater the thickness of slice, the longer the time of treatment which is necessary with brine of any given concentration to provide a final product of a given salt content.

SODIUM CHLORIDE CONCENTRATION

The concentration of sodium chloride in the brine can be varied within wide limits. The concentration of sodium chloride in the brine should be greater than that desired in the cured meat. Generally, the concentration will not be less than 10%, weight/volume, because pig meat treated with brine of a lower concentration tends to become excessively wet, and also the desired concentration of salt in the cured meat will not be attained or will be difficult to attain. The upper limit of sodium chloride concentration in the brine is set by the solubility of sodium chloride, about 32% weight/volume being a saturated solution at room temperature. It is often convenient to use brine having a concentration of about 20–22% of sodium chloride but other concentrations can equally well be used.

CONCENTRATION OF NITRITE

It is necessary to incorporate nitrite ions in the brine an alkali metal nitrite being a convenient source. (The term "alkali metal" is taken to include ammonium). Too low a nitrite level in the meat will tend to give a product which tastes of pork, rather than of cured meat, whilst too high a level may cause discolouration, particularly of the lean meat. Simple tests will serve to show the range of nitrite concentration which can be used in any particular case. Within these limits the concentration of nitrite is not highly critical but in general, increasing amounts will be used in the brine with increasing sodium chloride concentration. As little as 0.005% of alkali metal nitrite may be sufficient depending on slice thickness, sodium chloride concentration and time of treatment—usually, at least 0.01%–0.05% will be used, whilst 0.1% is frequently a convenient level. 1% will generally not be exceeded. It is advisable that the slices on removal from the brine should not contain more than 200 parts per million of nitrite.

TIME OF TREATMENT

The time for which the slices must be treated with brine to give a product which will subsequently mature to a cured meat is determined to a large extent by the thickness of the slices, the concentration of sodium chloride in the brine and the salt content desired in the cured meat. It is often useful to aim at a salt content in the cured meat of 5–12%, particularly 8–10%, measured as a percentage of sodium chloride, weight/volume of the aqueous phase of the cured meat. The salt content of the cured meat may, however, be varied widely with regard to the preference of the individual consumer and the process may be applied equally well to cured meats of other salt contents.

In general, the higher the concentration of sodium chloride in the brine, and the smaller the slice thickness the more rapid will be the curing and the less the time of treatment required. The minimum time of treatment with the brine permissible may be less than one minute depending on the factors mentioned above. To obtain a cured meat having a salt content in its aqueous phase of about 8% and using a brine containing about 20% sodium chloride, weight/volume, slices of 25 mms. in thickness require about 5–6 hours treatment with the brine, slices of about 8 mms. thickness require less than 15 minutes' treatment, whilst for slices of about 4 mms. as little as two or three minutes treatment will generally suffice. The treatment with brine will not in any case extend beyond one day.

TEMPERATURE OF BRINE DURING TREATMENT

The temperature of the brine duing treatment of the slices is not highly critical although in general, the higher the temperature of the brine the more rapid is the cure. The treatment may be carried out below room temperature or in the region of room temperature or at an elevated temperature. It is possible to work at temperatures of 50–55° C. or higher provided that no undesirable factors such as excessive melting and separation of the fat or denaturation of the protein occur. If the slices are treated at temperatures above about 60° C., however, the product obtained resembles ham rather than bacon.

Having regard to the factors set out above it will therefore be seen that the process is capable of operations under a wide variety of conditions to produce cured meats in a time shorter than by traditional processes. The operation of the process will now be described.

The pig meat, which may be received in the form of blocks, is boned and sliced into slices of the desired thickness. It is frequently convenient to chill the meat before slicing, as a chilled joint will tend to give a firmer slice on cutting. It is usually advantageous from this point of view to slice the meat at a temperature of −2° C. to +4° C. particularly about −1° C. The pig meat may be sliced satisfactorily by means of a standard commercial bacon slicer.

The slices are then treated with brine for the required time, usually by immersion in the brine. When treating slices of back pig meat, the eye muscle end of the slice takes up brine more slowly than the other end. In dipping or immersing slices of back pig meat for very short times it is thus advantageous if the eye muscle end is immersed for longer than the other end of the slice.

The treated slices are removed from the brine and drained free from excess liquid. The slices may be slightly dried, if desired, by a stream of warm air at, for instance, about 35° C. If smoked bacon is required smoking by gaseous smoke may conveniently be carried out at this stage. Alternatively, liquid smoke may be added to the brine or the pig meat can be smoked prior to curing in the brine.

The slices are subsequently allowed to mature. If allowed to mature in air, the characteristic pinkish colour of bacon or ham will not usually develop and the slices remain brown in colour although they may become pink on cooking. A cured flavour will develop, however.

It is preferred to provide the slices with a substantially anaerobic atmosphere in which to mature. Preferably, when making slices of bacon or ham the slices are provided with a substantially anaerobic atmosphere as soon as possible after they are removed from the brine as the time which the slices take to develop the characteristic colour of bacon or ham will be longer, the longer they are exposed to air after removal from the brine.

The substantially anaerobic atmosphere may be provided, usually inside a container, either by direct displacement of the air with an inert gas, such as nitrogen, or by the application of sub-atmospheric pressure. Alternatively, the slices may be placed in a closed environment having an oxygen level such that the oxygen is capable of being used up by the meat, or by substances added to the meat, so as to provide a substantially anaerobic atmosphere. In general, the slices will be packed in suitable containers, which will be sealed. Preferably, the air will be substantially removed from the container, before sealing, but in many cases sealing the slices of meat in the container will provide the slices with an atmosphere sufficiently poor that the oxygen will be used up by the meat and the atmosphere will become substantially anaerobic.

Bags or packets made of thermo-plastic film, such as polyethylene, polyvinyl chloride/polyvinylidene chloride, or laminates of these materials with cellophane can be used as containers, but the container can be made of other sufficiently moisture and air impervious material, such as cans or glass jars.

Under the substantially anaerobic conditions described above the characteristic colour and flavour of bacon, ham or other cured meat (depending on the nature of the treatment which the slices have received) will generally develop within a few hours.

Sliced cured meats prepared according to the present process have an extended shelf life at a room temperature and are more uniform in their properties than are cured meats prepared by conventional means.

A cooking treatment may be given to the meat slices after their removal from the brine to assist in the preparation of hams or other cooked cured meats.

The present invention may be carried out as a continuous process.

The following examples illustrate the invention:

*Example 1*

Pig flesh was chilled to −2° C. and sliced on a conventional bacon slicer to give slices of 3.5 mms. thickness. The slices were immersed in a solution containing 22% sodium chloride and 0.1% sodium nitrite for three minutes at 20° C. The slices were then removed and excess liquid allowed to drain off for three minutes. They were then dried in a warm air stream at 35° C. for ten minutes, inverted and dried for a further ten minutes. The slices were then placed in bags made of a laminate of polyethylene and cellophane and vacuum sealed at an internal pressure of 15 mms. Hg. After about four hours the characteristic colour and flavour of bacon had developed.

*Example 2*

A shoulder joint of pig meat was frozen to −1° C. and sliced to give slices of 2 mms. thickness.

The slices were then immersed in brine containing 22% sodium chloride, weight/volume, and 0.1% sodium nitrite, for 30 seconds. The slices were removed, drained and vacuum packed in bags consisting of a laminate of polyethylene and cellophane. After 2 hours the meat was cooked by suspending the bags for 20 minutes in an oven at 95° C. The colour and flavour of ham was found to have developed within a few hours, although the colour faded on keeping. The product was kept for 10 days at 20° C.—and when the bags were opened the contents had the characteristic flavour of ham and were palatable to eat.

*Example 3*

Joints of pig flesh were chilled to −1° C. and sliced by a standard commercial bacon slicer to give slices of the various thicknesses indicated in the table below.

The slices were immersed in brine of the composition indicated and for the time indicated in the table below.

The slices were removed from the brine and excess liquid allowed to drain off.

The slices were then packed in bags of a laminate of polyethylene and cellophane at an internal pressure of about 15 mms. Hg.

In all cases the colour and flavour of bacon developed on keeping for a few hours.

| Slice thickness (mms.) | Time of immersion (minutes) | Sodium chloride concentration, percent weight/volume | Sodium nitrite concentration, percent weight/volume | Temperature, °C. | Salt content of cured meat, percent | Solids content of cured meat, percent | Salt content expressed as percent of aqueous phase |
|---|---|---|---|---|---|---|---|
| 3.7 | 15 | 14 | 0.01 | 20 | 3.3 | 58.6 | 8.1 |
| 3.7 | 18 | 14 | 0.01 | 20 | 3.5 | 59.6 | 8.6 |
| 3.7 | 21 | 14 | 0.01 | 20 | 3.9 | 56.5 | 8.9 |
| 3.7 | 24 | 14 | 0.01 | 20 | 4.1 | 62.0 | 10.7 |
| 3.7 | 18 | 14 | 0.01 | 30 | 3.9 | 57.6 | 9.3 |
| 3.7 | 21 | 14 | 0.01 | 30 | 3.9 | 59.3 | 9.7 |
| 3.7 | 12 | 18 | 0.01 | 22 | 3.7 | 60.2 | 9.3 |
| 3.7 | 14 | 18 | 0.01 | 22 | 3.9 | 57.7 | 9.3 |
| 3.7 | 8 | 22 | 0.1 | 10 | 4.1 | 50.2 | 8.3 |
| 3.7 | 3 | 22 | 0.1 | 20 | 3.6 | 56.8 | 8.4 |
| 3.7 | 2 | 22 | 0.1 | 50 | 3.5 | 55.1 | 7.7 |
| 3.7 | 3 | 26 | 0.1 | 20 | 3.8 | 54.9 | 8.3 |
| 3.7 | 3.5 | 26 | 0.1 | 20 | 4.1 | 55.3 | 9.1 |
| 3.7 | 4 | 26 | 0.1 | 20 | 4.3 | 58.0 | 9.8 |
| 2.6 | 3 | 22.9 | 0.1 | 20 | 3.2 | 61.3 | 8.1 |
| 4.8 | 3 | 22.9 | 0.1 | 20 | 2.0 | 59.1 | 5.0 |
| 7.4 | 90 | 14 | 0.005 | 20 | 4.6 | 45.0 | 8.4 |

What is claimed is:

1. A method for rapidly producing cured, packed slices of pig meat which comprises the steps of slicing pig meat into slices having a thickness ranging from about 2 mms. to about 8 mms., dipping the slices in brine containing 0.005–0.5% of an alkali metal nitrite and from 10% to 32% weight/volume of sodium chloride at from 10° to 55° C. for from 30 seconds to 15 minutes, draining the slices, sealing them in an air-impermeable container in the substantial absence of free oxygen, and allowing the slices to mature in the container for a few hours, said time of dipping the slices in the brine being sufficient to provide from 5 to 12% of sodium chloride, weight/volume, in the aqueous phase of the cured slices.

2. A method for rapidly producing cured, packed slices of pig meat which consists essentially of the steps of slicing pig meat into slices having a thickness ranging from about 2 mms. to about 4 mms., dipping the slices in brine containing 0.005–0.5% of an alkali metal nitrite and from 10% to 32% weight/volume of sodium chloride at from 10° to 55° C. for from 30 seconds to 4 minutes, draining the slices, vacuum-sealing them in an air-impermeable container in the substantial absence of free oxygen, and allowing the slices to mature in the container for a few hours, said time of dipping the slices in the brine being sufficient to provide from 5 to 12% of sodium chloride, weight/volume, in the aqueous phase of the cured slices.

3. A method for rapidly producing cured, packed slices of ham which comprises the steps of slicing raw pig meat into slices having a thickness ranging from about 2 mms. to about 8 mms., dipping the slices in brine containing 0.005–0.5% of an alkali metal nitrite and from 10% to 32% weight/volume of sodium chloride at from 10° to 55° C. for from 30 seconds to 15 minutes, draining the slices, sealing them in an air-impermeable container in the substantial absence of free oxygen, allowing the slices to mature in the container for a few hours, and cooking the slices while still sealed in the container, said time of dipping the slices in the brine being sufficient to provide from 5 to 12% of sodium chloride, weight/volume, in the aqueous phase of the cured slices.

References Cited in the file of this patent

UNITED STATES PATENTS

| 1,911,009 | Woidich | May 23, 1933 |
| 2,117,478 | Hall | May 17, 1938 |
| 2,461,291 | McKee | Feb. 8, 1949 |
| 2,627,473 | Brissey | Feb. 3, 1953 |
| 2,797,998 | Praizler | July 2, 1957 |
| 2,902,369 | Komarik | Sept. 1, 1959 |

OTHER REFERENCES

Food Technology, February 1956, pp. 101, 102, 103.